(12) United States Patent
Decker (10) Patent No.: US 10,597,134 B2
(45) Date of Patent: Mar. 24, 2020

(54) ADHESIVE JOINTS FOR AIRCRAFT (71) Applicant: Textron Innovations Inc., Providence, RI (US)

(72) Inventor: George Ryan Decker, Fort Worth, TX (US)

(73) Assignee: Textron Innovations Inc., Providence, PR (US)

( * ) Notice: Subject to any disclaimer, the term of this patent is extended or adjusted under 35 U.S.C. 154(b) by 456 days.

(21) Appl. No.: 15/437,198

(22) Filed: Feb. 20, 2017

(65) Prior Publication Data
US 2018/0237119 A1    Aug. 23, 2018

(51) Int. Cl.
*B64C 1/12*    (2006.01)
*B64C 3/26*    (2006.01)

(52) U.S. Cl.
CPC . *B64C 1/12* (2013.01); *B64C 3/26* (2013.01)

(58) Field of Classification Search
CPC ......... B64C 1/12; B64C 3/26; Y10T 403/473; F16B 11/006
See application file for complete search history.

(56) References Cited

U.S. PATENT DOCUMENTS

| | | | | |
|---|---|---|---|---|
| 3,937,425 A * | 2/1976 | Harvey | ...... | B64C 3/26 244/123.5 |
| 4,032,089 A * | 6/1977 | Kinzler | ...... | B29C 35/0272 244/123.1 |
| 4,225,372 A * | 9/1980 | Kinzler | ...... | B29C 63/02 156/154 |
| 4,739,954 A * | 4/1988 | Hamilton | ...... | B64C 3/26 244/123.1 |
| 8,156,711 B2 * | 4/2012 | Hethcock | ...... | B64C 1/068 52/790.1 |
| 8,632,712 B2 * | 1/2014 | Hethcock | ...... | B64C 1/068 264/263 |
| 2007/0011970 A1 * | 1/2007 | Hethcock | ...... | B64C 1/068 52/481.1 |
| 2012/0199269 A1 * | 8/2012 | Hethcock | ...... | B64C 1/068 156/79 |

* cited by examiner

*Primary Examiner* — Philip J Bonzell
(74) *Attorney, Agent, or Firm* — Lawrence Youst PLLC (57) ABSTRACT

An adhesive joint for an aircraft includes a first aircraft component having a first surface forming one or more isolation grooves, a second aircraft component having a second surface and an adhesive forming a bondline between the first and second surfaces to bond the first aircraft component to the second aircraft component. The adhesive substantially fills the one or more isolation grooves to form at least one disbond arrest boundary. The at least one disbond arrest boundary is operable to prevent a disbond in the bondline from traversing therethrough, thereby preventing the disbond from propagating along the bondline across the at least one disbond arrest boundary.

20 Claims, 6 Drawing Sheets

ADHESIVE JOINTS FOR AIRCRAFT

TECHNICAL FIELD OF THE DISCLOSURE

The present disclosure relates, in general, to adhesive joints for use on aircraft and, in particular, to adhesive joints having a non-uniform bondline to prevent propagation of disbonds occurring at the adhesive joint.

BACKGROUND

Adhesive joints, or bonds, are commonly used to bond aircraft components to one another. While other mechanical alternatives, such as fasteners, exist for coupling aircraft components, adhesive bonds are generally lighter than these alternatives while providing excellent stress transfer characteristics. Adhesive joints, however, can develop disbonds, such as cracks or voids, along the bondline. For example, a kissing bond, which is sometimes called a zero volume disbond, is adhesively bonded but holds little of the strength usually associated with that bond. A kissing bond may be caused by incorrect surface preparation, residual stress, moisture ingress, contamination, curing process errors, a manufacturing defect or a combination of these factors. Furthermore, disbonds that occur in adhesive joints can spread or propagate along the bondline between the bonded surfaces, causing a severely weakened or even failed bond. Such failed bonds can be catastrophic during flight, potentially causing a loose component to crash into the engine or other critical flight systems. Accordingly, a need has arisen for adhesive joints that prevent disbonds occurring therein from spreading or propagating, thereby maintaining the overall integrity of the adhesive joint despite the presence of such disbonds.

SUMMARY

In a first aspect, the present disclosure is directed to an adhesive joint for an aircraft including a first aircraft component having a first surface forming one or more isolation grooves, a second aircraft component having a second surface and an adhesive forming a bondline between the first and second surfaces to bond the first aircraft component to the second aircraft component. The adhesive substantially fills the one or more isolation grooves to form at least one disbond arrest boundary. The at least one disbond arrest boundary is operable to prevent a disbond in the bondline from traversing therethrough, thereby preventing the disbond from propagating along the bondline across the at least one disbond arrest boundary.

In some embodiments, the at least one disbond arrest boundary may define a plurality of isolation regions. In such embodiments, the at least one disbond arrest boundary may be operable to prevent a disbond originating in one of the plurality of isolation regions traversing therethrough, thereby isolating the disbond to the originating isolation region. In certain embodiments, the bondline may include a non-uniform bondline. In some embodiments, the one or more isolation grooves may include a plurality of isolation grooves and the adhesive may substantially fill the plurality of isolation grooves to form a plurality of disbond arrest boundaries. In certain embodiments, the plurality of isolation grooves may be substantially parallel to one another and the plurality of disbond arrest boundaries may be substantially parallel to one another.

In some embodiments, the plurality of isolation grooves may have a substantially uniform depth. In certain embodiments, the plurality of isolation grooves may each have the same shape. In some embodiments, the plurality of isolation grooves may be substantially evenly spaced along the first surface. In certain embodiments, the one or more isolation grooves may include one or more macroscopic isolation grooves. In some embodiments, the one or more isolation grooves may include one or more linear isolation grooves. In certain embodiments, the one or more isolation grooves may include one or more round-nosed isolation grooves, such as one or more round-nosed isolation grooves having a sine wave or a mouse hole shape. In some embodiments, the one or more isolation grooves may include one or more angular isolation grooves, such as one or more angular isolation grooves having a square shape, a rectangular shape or a V-shape. In certain embodiments, the adhesive joint may include at least one bondline gap disposed within the at least one disbond arrest boundary. In some embodiments, the first and second surfaces may each include a composite material or metal.

In a second aspect, the present disclosure is directed to an aircraft including an airframe, a first aircraft component having a first surface forming one or more isolation grooves, a second aircraft component having a second surface and an adhesive forming a bondline between the first and second surfaces to bond the first aircraft component to the second aircraft component. The adhesive substantially fills the one or more isolation grooves to form at least one disbond arrest boundary. The at least one disbond arrest boundary is operable to prevent a disbond in the bondline from traversing therethrough, thereby preventing the disbond from propagating along the bondline across the at least one disbond arrest boundary.

In some embodiments, the airframe component may be a rib of a wing member and the aircraft skin component may be a wing skin component. In other embodiments, the airframe component may be a spar of a wing member and the aircraft skin component may be a wing skin component. In further embodiments, the airframe component may be a fuselage frame component and the aircraft skin component may be a fuselage skin component.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
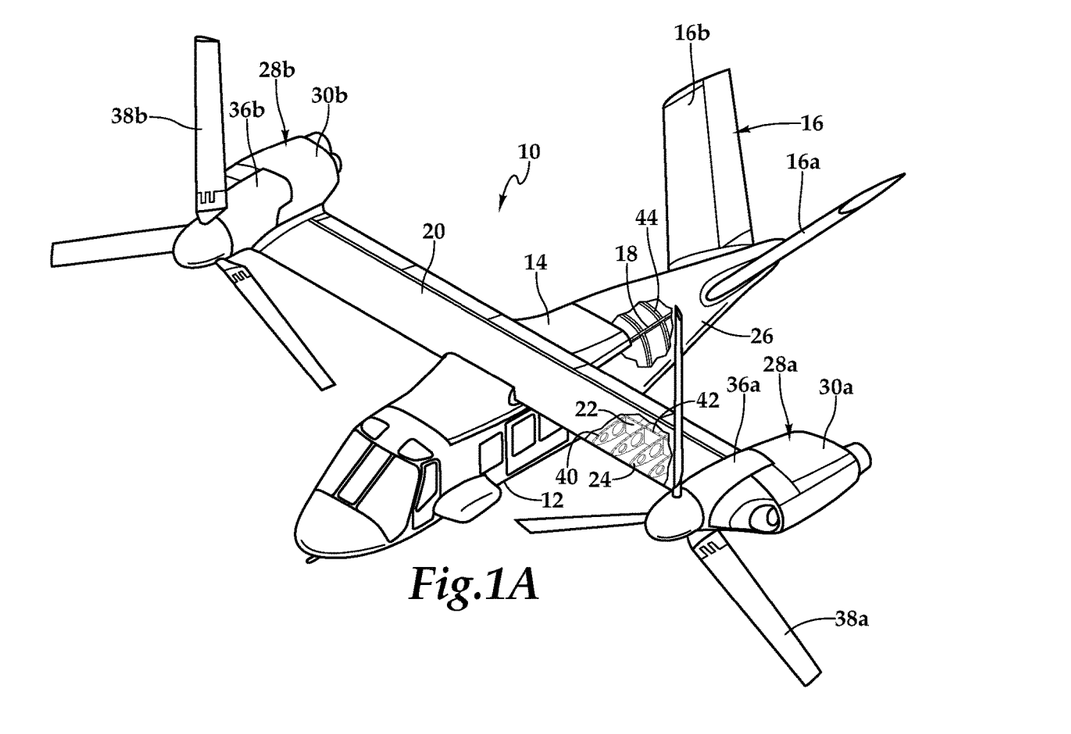
FIGS. 1A-1B are schematic illustrations of a tiltrotor aircraft utilizing adhesive joints in accordance with embodiments of the present disclosure.
Figure 1B:
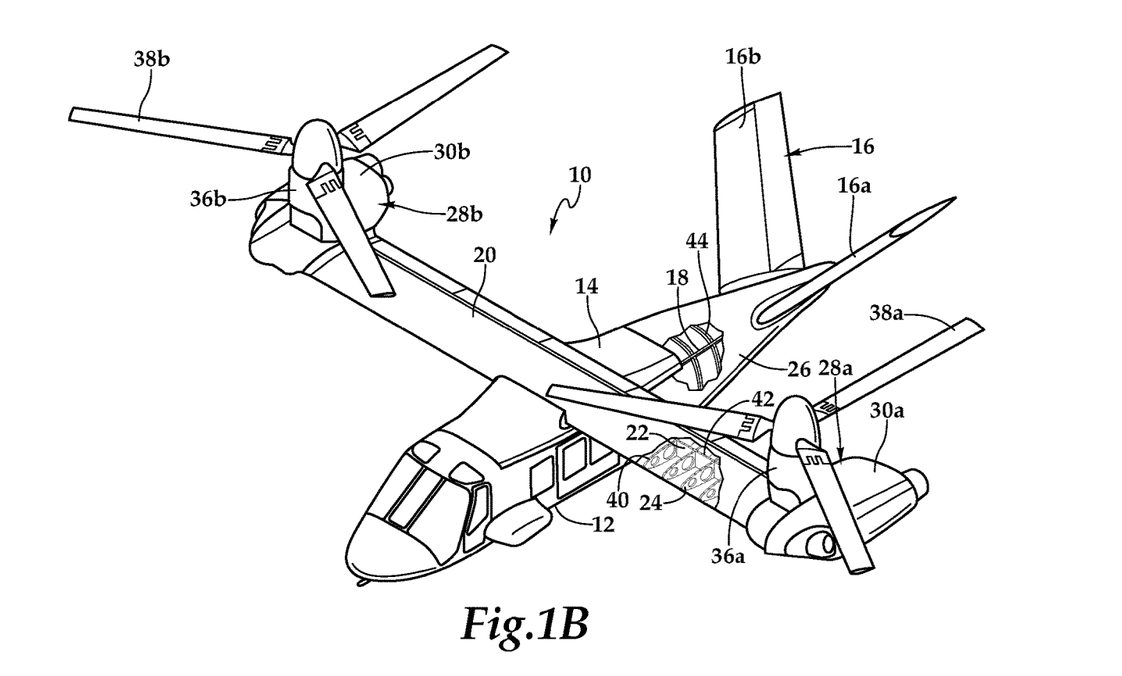

Referring to FIGS. 1A-1B and 2A-2B in the drawings, a tiltrotor aircraft is schematically illustrated and generally designated 10. Aircraft 10 includes a fuselage 12, a wing mount assembly 14 and a tail assembly 16 including rotatably mounted tail members 16a, 16b having control surfaces operable for horizontal and/or vertical stabilization during forward flight. Fuselage 12 is supported by an airframe 18, which extends through various portions of aircraft 10. A wing member 20 is positioned within wing mount assembly 14. Spar 22 and ribs 24 are disposed in wing member 20 and form a portion of airframe 18. A skin 26 covers airframe 18, including spar 22 and ribs 24, to form the exterior surface of aircraft 10, including the exterior surface of fuselage 12 and wing member 20. Located at outboard ends of wing member 20 are propulsion assemblies 28a, 28b. Propulsion assembly 28a includes a nacelle depicted as fixed pylon 30a that houses an engine 32 and a transmission 34. Thus, the nacelle is fixed relative to wing member 20. In addition, propulsion assembly 28a includes a mast assembly 36a that is rotatable relative to fixed pylon 30a between a generally horizontal orientation, as best seen in FIG. 1A, and a generally vertical orientation, as best seen in FIG. 1B. Propulsion assembly 28a also includes a proprotor assembly 38a that is rotatable relative to mast assembly 36a responsive to torque and rotational energy provided via a rotor hub assembly and drive system mechanically coupled to engine 32 and transmission 34. Similarly, propulsion assembly 28b includes a nacelle depicted as fixed pylon 30b that houses an engine and transmission, a mast assembly 36b that is rotatable relative to fixed pylon 30b and a proprotor assembly 38b that is rotatable relative to mast assembly 36b responsive to torque and rotational energy provided via a rotor hub assembly and drive system mechanically coupled to the engine and transmission housed by fixed pylon 30b. As used herein, including in the claims, the term "coupled" may include direct or indirect coupling by any means, including moving and/or non-moving mechanical connections.

FIG. 1A illustrates aircraft 10 in airplane or forward flight mode, in which proprotor assemblies 38a, 38b are rotating in a substantially vertical plane to provide a forward thrust enabling wing member 20 to provide a lifting force responsive to forward airspeed, such that aircraft 10 flies much like a conventional propeller driven aircraft. Unless otherwise indicated, as used herein, "or" does not require mutual exclusivity. FIG. 1B illustrates aircraft 10 in helicopter or vertical takeoff and landing (VTOL) flight mode, in which proprotor assemblies 38a, 38b are rotating in a substantially horizontal plane to provide a lifting thrust, such that aircraft 10 flies much like a conventional helicopter. It should be appreciated that aircraft 10 can be operated such that proprotor assemblies 38a, 38b are selectively positioned between forward flight mode and VTOL flight mode, which can be referred to as a conversion flight mode.

Skin 26 is adhered to airframe 18 using an adhesive, thereby forming a bondline between skin 26 and airframe 18. The bondline between skin 26 and airframe 18 is susceptible to forming disbonds, such as voids and cracks. Such disbonds may have a variety of causes, such as particle contamination between skin 26 and airframe 18. Disbonds are particularly problematic when they spread, or propagate, along the bondline to weaken the overall adhesive joint between skin 26 and airframe 18. The illustrative embodiments include isolation grooves 40, 42, 44 disposed on the surface of ribs 24, spar 22 and the fuselage portion of airframe 18, respectively. The adhesive interposed between skin 26 and airframe 18 substantially fills isolation grooves 40, 42, 44 to form disbond arrest boundaries, or soft spots, through which disbonds in the bondline cannot traverse, thereby preventing the disbond from spreading along the bondline and reducing the possibility of a partial or catastrophic separation between skin 26 and airframe 18. In addition to utilizing an adhesive joint, it will be appreciated that skin 26 may also be coupled to airframe 18 using fasteners, such as rivets, or other coupling techniques.

Figure 2A:
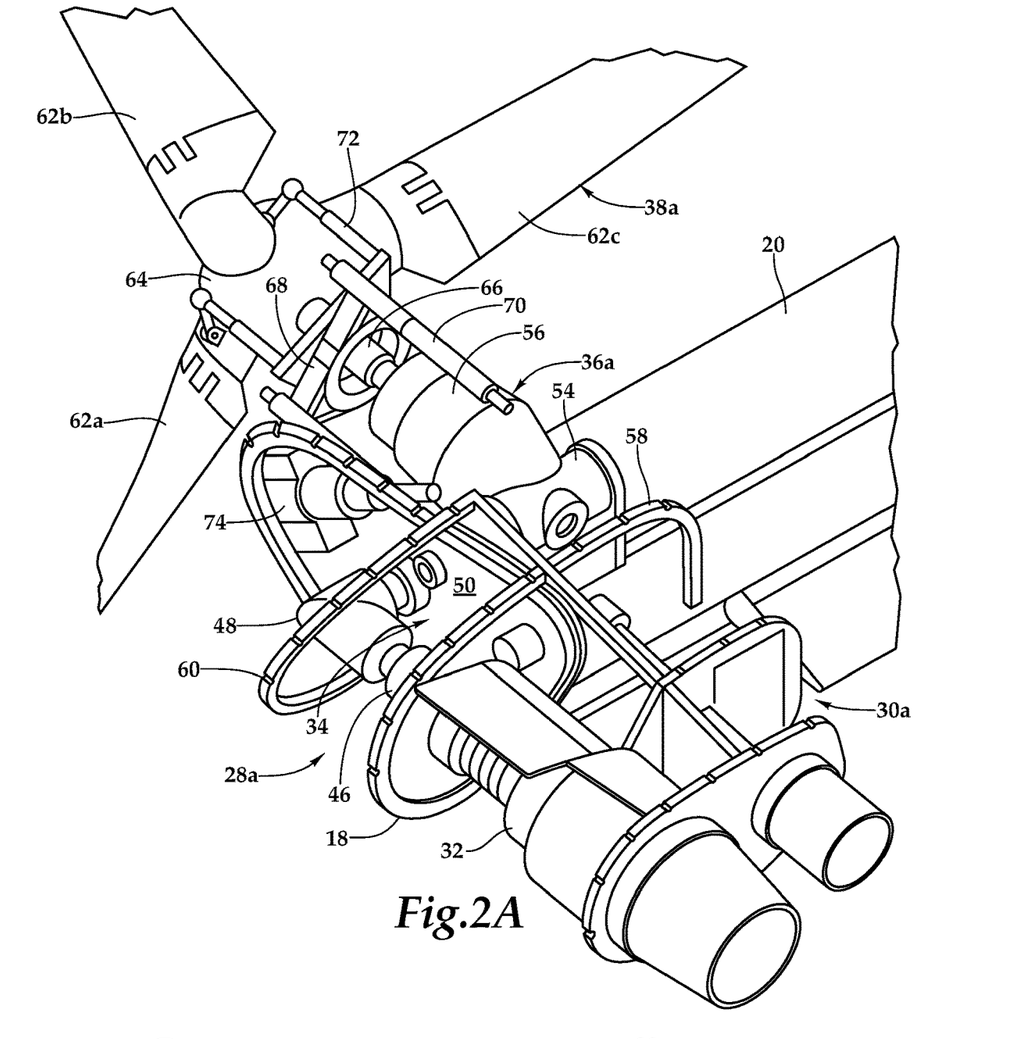
FIG. 2A is an isometric view of an exemplary propulsion system for a tiltrotor aircraft utilizing adhesive joints in accordance with embodiments of the present disclosure.
Figure 2B:
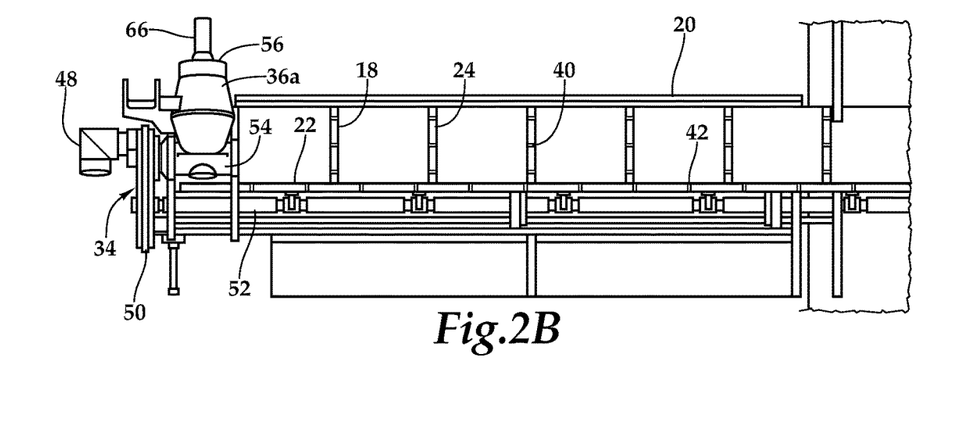
FIG. 2B is a top view of an exemplary wing section of a tiltrotor aircraft that utilizes adhesive joints in accordance with embodiments of the present disclosure.

Referring now to FIGS. 2A-2B, propulsion assembly 28a is disclosed in further detail. Propulsion assembly 28a is substantially similar to propulsion assembly 28b therefore, for sake of efficiency, certain features will be disclosed only with regard to propulsion assembly 28a. One having ordinary skill in the art, however, will fully appreciate an understanding of propulsion assembly 28b based upon the disclosure herein of propulsion assembly 28a. Engine 32 of propulsion assembly 28a is substantially fixed relative to wing member 20. An engine output shaft 46 transfers power from engine 32 to a spiral bevel gearbox 48 that includes spiral bevel gears to change torque direction by 90 degrees from engine 32 to a fixed gearbox 50 via a clutch. Fixed gearbox 50 includes a plurality of gears, such as helical gears, in a gear train that are coupled to an interconnect drive shaft 52 and a quill shaft (not visible) that supplies torque to an input in spindle gearbox 54 of proprotor gearbox 56. Interconnect drive shaft 52 provides a torque path that enables a single engine of aircraft 10 to provide torque to both proprotor assemblies 38a, 38b in the event of a failure of the other engine. In the illustrated embodiment, interconnect drive shaft 52 includes a plurality of segments that share a common rotational axis.

Engine 32 is housed and supported in fixed pylon 30a (see FIGS. 1A-1B) that may include features such as an inlet, aerodynamic fairings and exhaust, as well as other structures and systems to support and facilitate the operation of engine 32. Airframe 18 includes a propulsion assembly airframe section 58 that supports propulsion assembly 28a. Similar to ribs 24, spar 22 and the fuselage portion of airframe 18, propulsion assembly airframe section 58 includes isolations grooves 60 to prevent the spreading of disbonds in the bondline between propulsion assembly airframe section 58 and the skin adhered thereon. Proprotor assembly 38a of propulsion assembly 28a includes three rotor blades 62a, 62b, 62c that are coupled to a rotor hub 64. Rotor hub 64 is coupled to a mast 66 that is coupled to proprotor gearbox 56. Together, spindle gearbox 54, proprotor gearbox 56 and mast 66 are part of mast assembly 36a that rotates relative to fixed pylon 30a. In addition, it should be appreciated by those having ordinary skill in the art that mast assembly 36a may include different or additional components, such as a pitch control assembly depicted as swashplate 68, actuators 70 and pitch links 72, wherein swashplate 68 is selectively actuated by actuators 70 to selectively control the collective pitch and the cyclic pitch of rotor blades 62a, 62b, 62c via pitch links 72. A linear actuator, depicted as conversion actuator 74 of fixed pylon 30a, is operable to reversibly rotate mast assembly 36a relative to fixed pylon 30a, which in turn selectively positions proprotor assembly 38a between forward flight mode, in which proprotor assembly 38a is rotating in a substantially vertical plane, and VTOL flight mode, in which proprotor assembly 38a is rotating in a substantially horizontal plane.

It should be appreciated that aircraft 10 is merely illustrative of a variety of aircraft that can implement the embodiments disclosed herein. Indeed, adhesive joints that utilize isolation grooves, such as isolation grooves 40, 42, 44, 60, may be implemented on any aircraft that uses adhesive joints, including the airframes of such aircraft. Other aircraft implementations can include hybrid aircraft, tiltwing aircraft, quad tiltrotor aircraft, unmanned aircraft, gyrocopters, airplanes, jets, helicopters and the like. As such, those of ordinary skill in the art will recognize that the adhesive joints of the illustrative embodiments can be integrated into a variety of aircraft configurations. It should be appreciated that even though aircraft are particularly well-suited to implement the embodiments of the present disclosure, non-aircraft vehicles and devices can also implement the embodiments, including, but not limited to, automobiles, land-based vehicles or machinery.

Figure 3A:
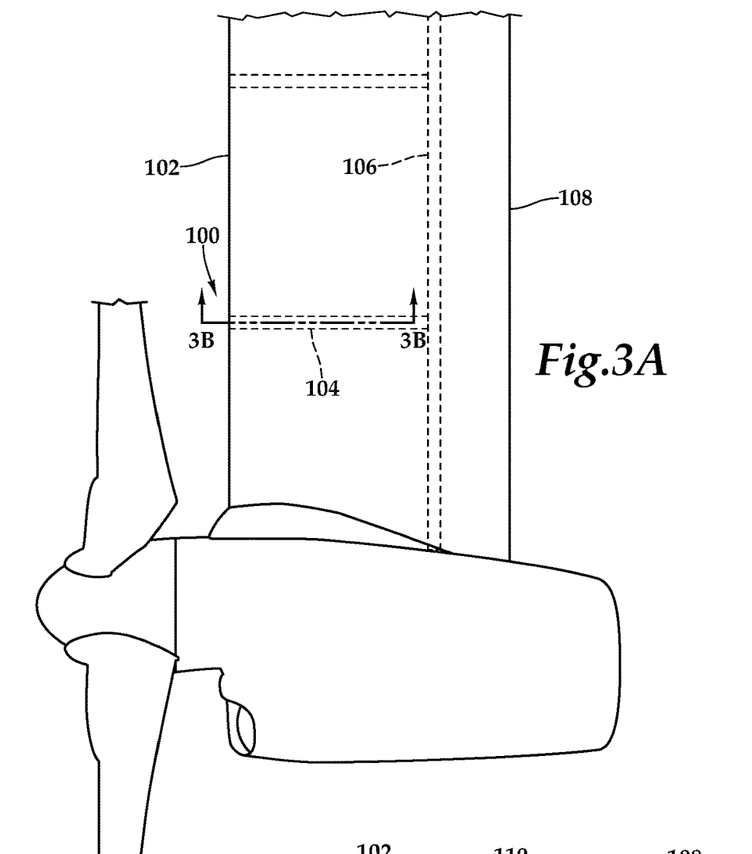
FIGS. 3A-3C are various views of an adhesive joint implemented on a wing of an aircraft in accordance with embodiments of the present disclosure.
Figure 3B:
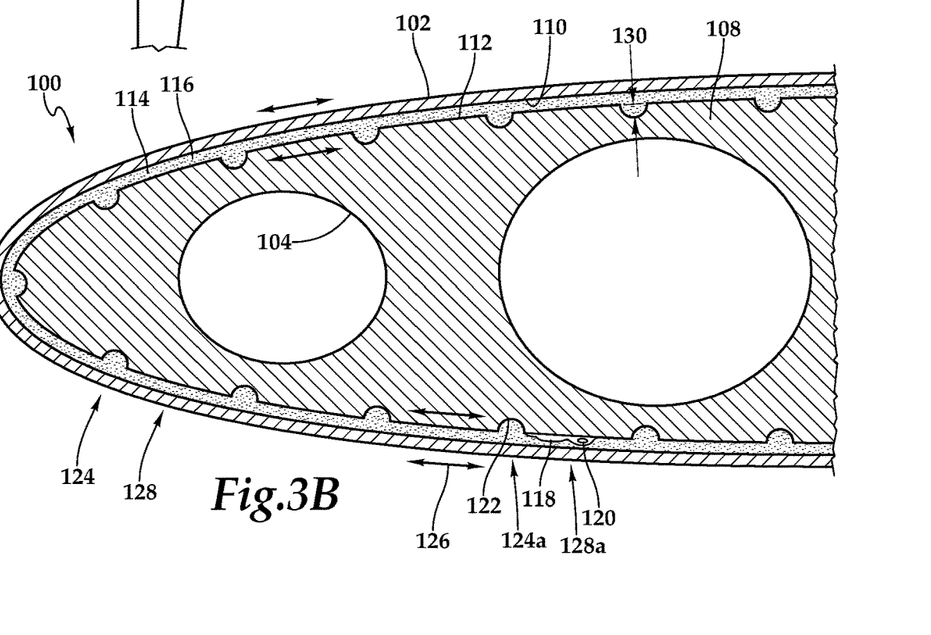

Referring to FIGS. 3A-3D in the drawings, an adhesive joint, or bond, is schematically illustrated and generally designated 100. Skin 102 is adhered to one or more ribs 104 and spar 106 to form the structure of wing member 108. As best seen in FIG. 3B, which is a cross-sectional view of wing member 108 taken along line 3B-3B in FIG. 3A, surface 110 of skin 102 is bonded to surface 112 of rib 104 by adhesive 114 to form bondline 116 between surfaces 110, 112. Bondline 116 is susceptible to forming a disbond, such as disbond 118, for a variety of reasons. For example, disbond 118 may be caused by a kissing bond between surfaces 110, 112, in which there is local intimate contact of surfaces 110, 112 such that no mechanical bond occurs. A kissing bond may be caused by incorrect surface preparation, residual stress, moisture ingress, contamination 120, curing process errors, a manufacturing defect or a combination of these factors. Other than tight tolerance controls, no robust method currently exists for preventing a kissing bond. Furthermore, disbond 118 is susceptible to spreading, or propagating, along bondline 116, thereby weakening adhesive joint 100. For example, once disbond 118 occurs, continued loading on wing member 108 may cause the spread of the disbonded area until detachment of the adhesive joint between skin 102 and rib 104 occurs. Previously, fasteners, such as rivets, have been installed around disbond 118 to prevent disbond 118 from spreading. However, such fasteners add to the weight and cost of an aircraft. Other previous attempts to prevent the spread of disbonds involved increasing the total bonded area of an adhesive joint to maintain high safety factors so that disbond 118 never occurs in the first place, although this method has the disadvantage of adding weight to the aircraft.

In the illustrative embodiments, disbond 118 is prevented from spreading along bondline 116 by isolation grooves 122 formed by surface 112 of rib 104. Adhesive 114 substantially fills isolation grooves 122 to form a bondline of non-uniform thickness that includes one or more disbond arrest boundaries 124, including disbond arrest boundary 124a. Disbond arrest boundaries 124 are disposed along isolation grooves 122 such that disbond arrest boundaries 124 may each be substantially coincident or parallel with a respective one of isolation grooves 122. In operation, if disbond 118 occurs adjacent to disbond arrest boundary 124a and then propagates along bondline 116, once disbond 118 contacts disbond arrest boundary 124a, which is a thicker adhesive area due to isolation grooves 122, the local strain is decreased such that the propagation of disbond 118 is arrested, protecting the remaining bonded area of adhesive joint 100. Thus, disbond arrest boundary 124a, which is adjacent to disbond 118, prevents disbond 118 from traversing therethrough. A disbond may be considered to be "adjacent" to its nearest one or more disbond arrest boundaries 124 regardless of the actual physical distance between the disbond and its nearest one or more disbond arrest boundaries 124. The illustrative embodiments arrest disbond propagation across adhesive joint 100 by locally reducing strain. Such strain may be caused by shear forces experienced by wing member 108 and acting along directions 126 that are generally orthogonal to isolation grooves 122. In this manner, disbond arrest boundaries 124 act as "crack stoppers" that protect the integrity of adhesive joint 100.

Disbond arrest boundaries 124 divide adhesive joint 100 into isolation regions 128, including isolation region 128a. Disbond 118 originates at isolation region 128a, which is adjacent to disbond arrest boundary 124a, among others. Disbond arrest boundary 124a prevents disbond 118 from traversing therethrough, thereby isolating disbond 118 to originating isolation region 128a. The illustrative embodiments are therefore able to isolate disbonds to particular regions of adhesive joint 100 so that disbonds cannot threaten the overall integrity of adhesive joint 100.

Figure 3C:
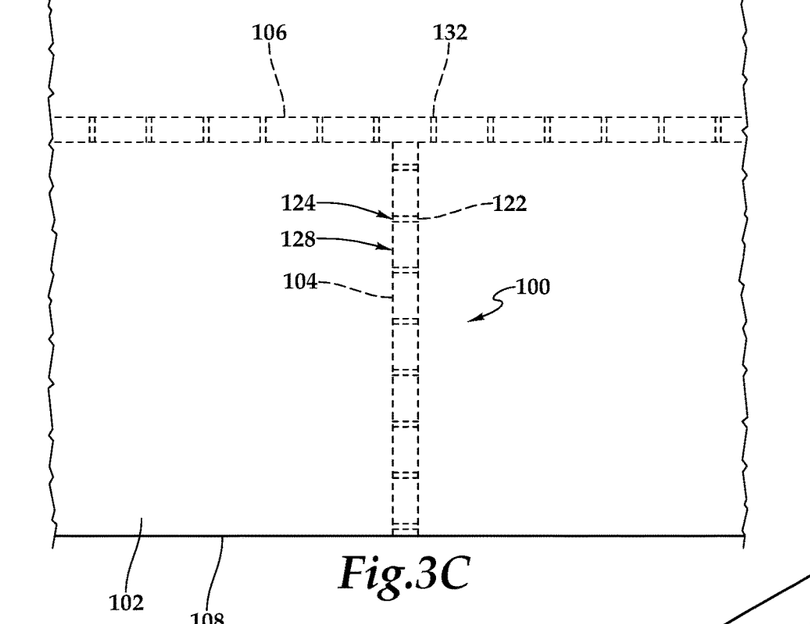
Figure 3D:
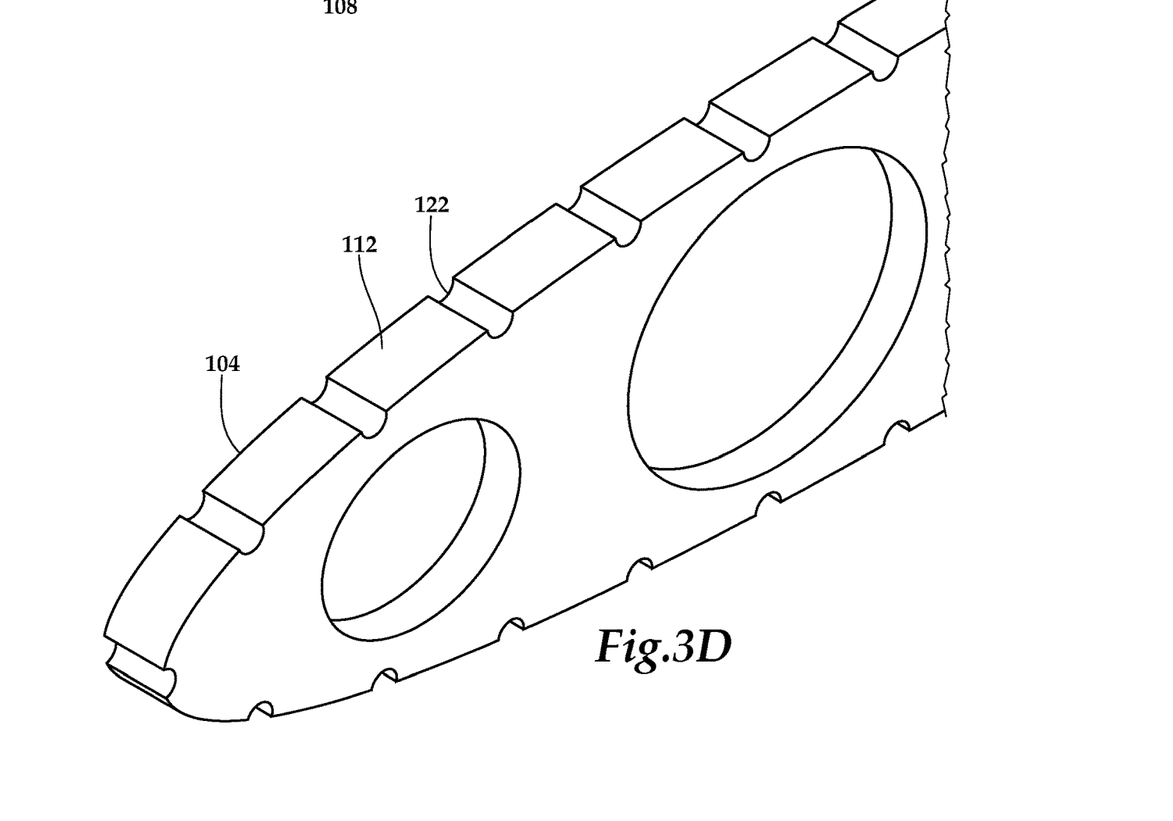
FIG. 3D is an isometric view of a rib having isolation grooves for use in an adhesive joint in accordance with embodiments of the present disclosure.

While adhesive joint 100 includes multiple isolation grooves 122, any number of isolation grooves 122 may be utilized in adhesive joint 100 including, in some examples, a single isolation groove. Because disbond arrest boundaries 124 are formed along isolation grooves 122, adhesive joint 100 may also include any number of disbond arrest boundaries 124. Surface 112 of rib 104 forms isolation grooves 122 that are substantially evenly spaced along surface 112. In one non-limiting example, rib 104 is two inches wide and isolation grooves 122 are evenly spaced at about two inches from one another. However, isolation grooves 122 may have any spacing therebetween, and may be unevenly spaced along surface 112. As best seen in FIG. 3C, isolation grooves 122 and disbond arrest boundaries 124 are substantially parallel to one another, although in other embodiments, isolation grooves 122 and disbond arrest boundaries 124 may be non-parallel or orthogonal to one another. Isolation grooves 122 have a substantially uniform depth 130, as best seen in FIG. 3B. In one non-limiting example, depth 130 of isolation grooves 122 may be in a range of 0.03-0.06 inches. However, isolation grooves 122 may have any depth, and may have non-uniform depths relative to one another.

As best seen in FIG. 3C, isolation grooves 122 and disbond arrest boundaries 124 are linear, although isolation grooves 122 and disbond arrest boundaries 124 may be any shape, linear or non-linear. Isolation grooves 122 are macroscopic features, which is in contrast to the microscopic features that have been previously applied to bondable surfaces by abrasion or chemical treatment to provide a non-uniform surface. Isolation grooves 122 all have the same round-nosed shape. In other embodiments, isolation grooves 122 may have non-uniform shapes relative to one another. The illustrative embodiments may be used in adhesive joints to bond materials of any composition. For example, either or both of skin 102 and rib 104, including surfaces 110, 112, may be made from metal, a composite material or any other material capable of being bonded.

It will be appreciated by one of ordinary skill in the art that the adhesive joints of the illustrative embodiments may be used to bond any components capable of being adhered to one another. For example, spar 106 may include isolation grooves 132 to form a non-uniform bondline thickness with skin 102. Longitudinal stiffness members or an airframe supporting the fuselage or tailboom of an aircraft may also include isolation grooves to form a non-uniform thickness bondline with other aircraft components, such as skin 102. The illustrative embodiments provide benefits for the design and analysis of structures, yielding both cost and weight savings. The illustrative embodiments can also save cost by delaying repair activity until, for example, a threshold number of isolation regions 128 have experienced disbonds, necessitating the re-adhesion of components.

Figure 4:
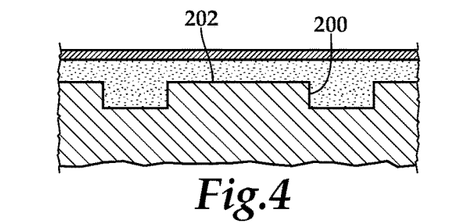
FIG. 4 is a cross-sectional view of an adhesive joint utilizing angular isolation grooves in accordance with embodiments of the present disclosure.
Figure 5:
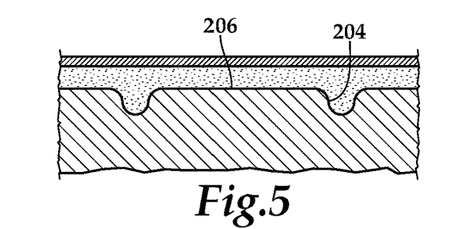
FIG. 5 is a cross-sectional view of an adhesive joint utilizing round-nosed isolation grooves in accordance with embodiments of the present disclosure.
Figure 6:
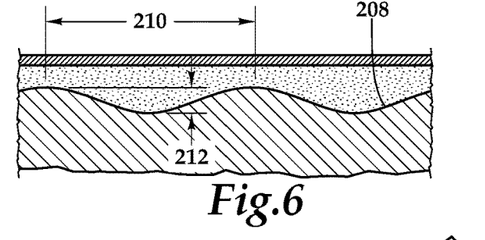
FIG. 6 is a cross-sectional view of an adhesive joint utilizing round-nosed isolation grooves in accordance with embodiments of the present disclosure.
Figure 7:
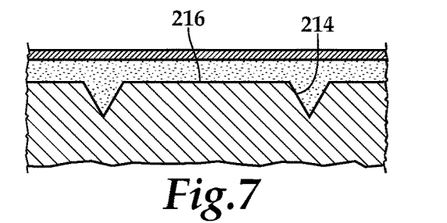
FIG. 7 is a cross-sectional view of an adhesive joint utilizing V-shaped isolation grooves in accordance with embodiments of the present disclosure.
Figure 8:
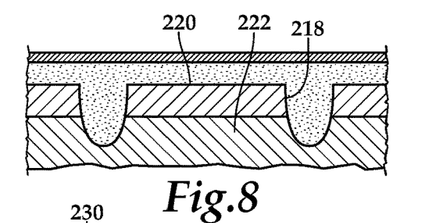
FIG. 8 is a cross-sectional view of an adhesive joint utilizing mouse hole-shaped isolation grooves in accordance with embodiments of the present disclosure.
Figure 9:
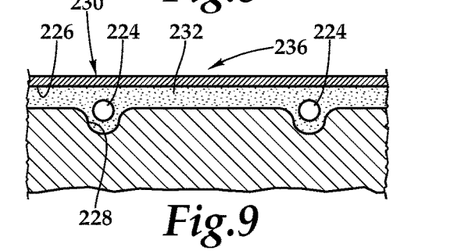
FIG. 9 is a cross-sectional view of an adhesive joint utilizing isolation tubes in accordance with embodiments of the present disclosure.

Referring to FIGS. 4-9 in the drawings, adhesive joints having various shapes and configurations are schematically illustrated. In FIG. 4, isolation grooves 200 have an angular, and in particular a rectangular, shape such that surface 202 approximates a square wave profile. In other embodiments, isolation grooves 200 may each have a square, polygonal or any other angular shape. In FIG. 5, isolation grooves 204 are round-nosed and approximate portions of a sine wave such that surface 206 approximates a sine wave profile. In FIG. 6, isolation grooves 208 are also round-nosed and approximate portions of a sine wave except that, in contrast to FIG. 5, width 210 of each isolation groove 208 is substantially greater than depth 212 of each isolation groove 208. The ratio between width 210 and depth 212 for each isolation groove 208 may vary based on the application. For example, the ratio between width 210 and depth 212 may be 2:1, 3:1, 5:1, 10:1 or any other ratio. In FIG. 7, isolation grooves 214 are angular and each have a "V" shape such that surface 216 approximates a sawtooth profile. In FIG. 8, isolation grooves 218 are round-nosed and each approximate a mouse hole shape. Each isolation groove 218 penetrates through the entire thickness of surface layer 220, and may partially penetrate through underlying layer 222. Surface layer 220 and underlying layer 222 may be made from the same or a different material. In FIG. 9, bondline gaps 224 are interposed between surface 226 and each isolation groove 228. The placement of bondline gaps 224 at each disbond arrest boundary 230 may provide further reinforcement against the propagation of disbonds along bondline 232. The size and shape of bondline gaps 224 may be varied to provide different disbond arrest characteristics. In other embodiments, bondline gaps 224 may be utilized in adhesive joint 236 in the absence of any isolation grooves 228, in which case bondline gaps 224 provide the sole barrier against the spread of a disbond along bondline 232.

Figure 10:
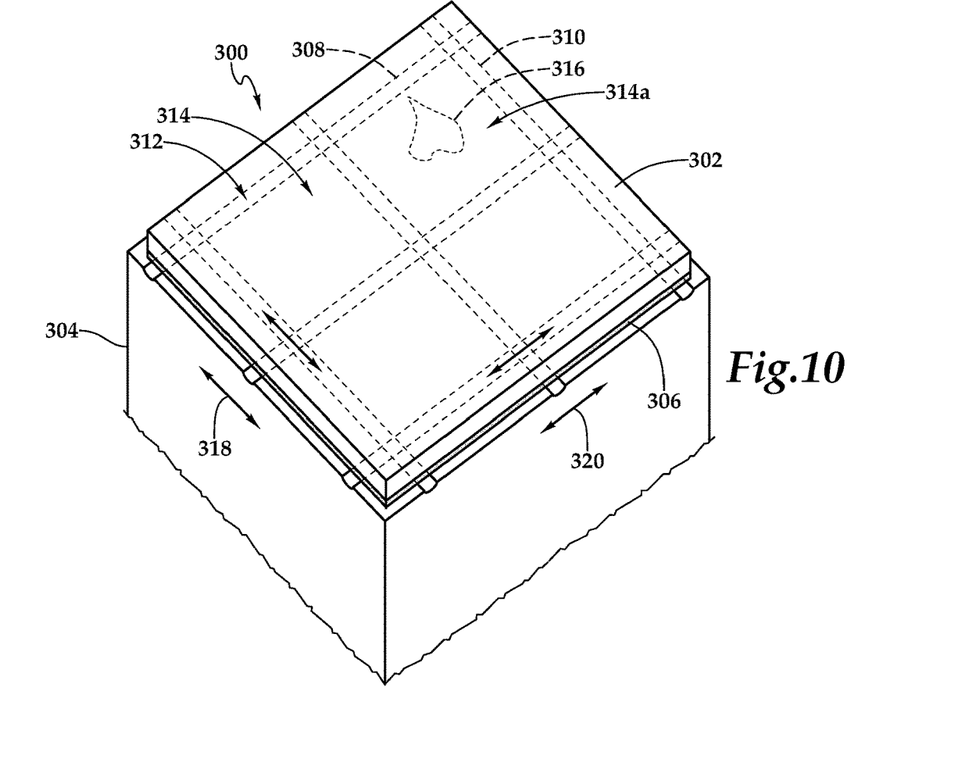
FIG. 10 is an isometric view of an adhesive joint utilizing orthogonal isolation grooves in accordance with embodiments of the present disclosure.

Referring to FIG. 10 in the drawings, an adhesive joint is schematically illustrated and generally designated 300. Aircraft components 302, 304 are adhered to one another by adhesive 306. A first set of parallel isolation grooves 308 is substantially orthogonal to a second set of parallel isolation grooves 310 to form a two-dimensional grid. Adhesive 306 substantially fills isolation grooves 308, 310 to form disbond arrest boundaries 312, which divide adhesive joint 300 into isolation regions 314, including isolation region 314a. Because disbond arrest boundaries 312 prevent disbonds from traversing therethrough, disbond 316 may be isolated to its originating isolation region 314a. Orthogonal isolation grooves may be particularly useful for biaxially loaded parts that experience forces, such as shear forces, in multiple directions. For example, aircraft components 302, 304 may experience shear forces along orthogonal directions 318 and 320. The presence of isolation grooves 308, 310 in an orthogonal configuration, as illustrated, may provide further reinforcement against the spread of disbond 316 due to shear forces since parallel isolation grooves 308 are generally perpendicular to sheer force direction 318 and parallel isolation grooves 310 are generally perpendicular to sheer force direction 320. In other embodiments, isolation grooves 308, 310 may form angles that are not orthogonal, including acute or obtuse angles. Indeed, the directionality of isolation grooves 308, 310 may depend on the shear forces or load path to which adhesive joint 300 is subjected.

Figure 11:
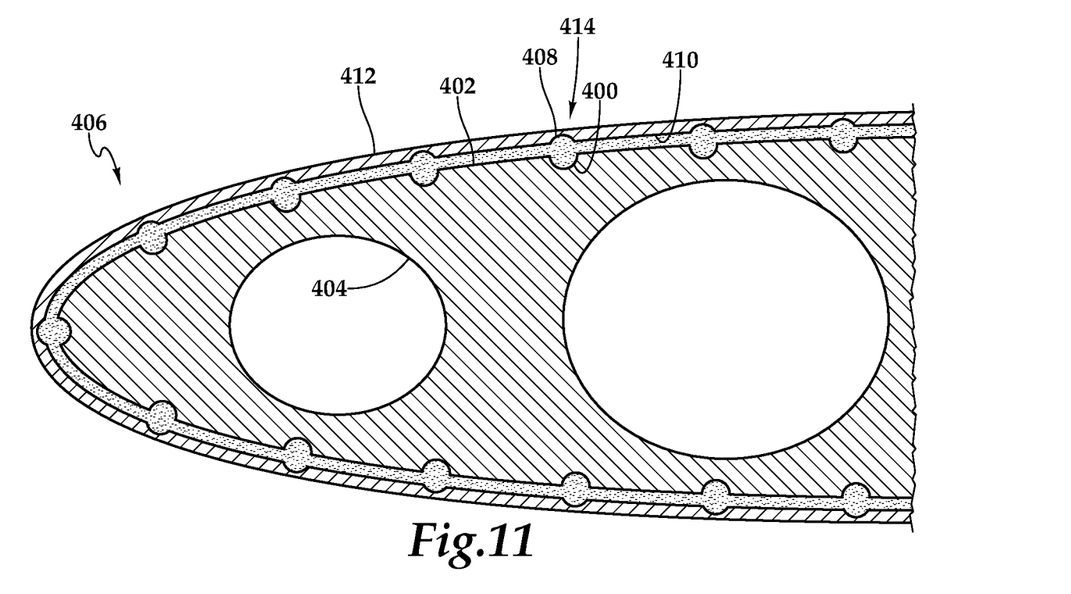
FIG. 11 is a cross-sectional view of an adhesive joint implemented on a wing of an aircraft in accordance with embodiments of the present disclosure.
Figure 12:
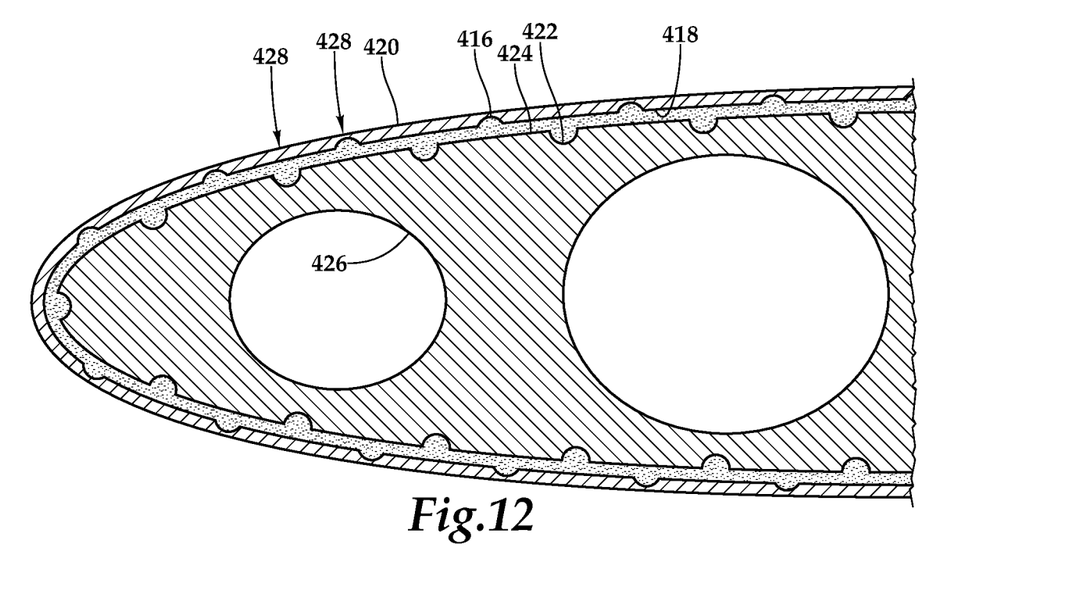
FIG. 12 is a cross-sectional view of an adhesive joint implemented on a wing of an aircraft in accordance with embodiments of the present disclosure.

Referring to FIGS. 11 and 12 in the drawings, adhesive joints having different configurations are schematically illustrated. In FIG. 11, in addition to isolation grooves 400 on surface 402 of rib 404, adhesive joint 406 also includes isolation grooves 408 on surface 410 of skin 412 to form disbond arrest boundaries 414. Isolation grooves 400 are each aligned, or substantially coincident, with a respective one of isolation grooves 408 at each disbond arrest boundary 414, thereby providing additional adhesive thickness at each disbond arrest boundary 414. In FIG. 12, isolation grooves 416 formed by surface 418 of skin 420 are misaligned with, or offset from, isolation grooves 422 formed by surface 424 of rib 426, thereby forming disbond arrest boundaries 428 at each isolation groove 416 and 422. Isolation grooves 416 may be offset from isolation grooves 422 by any distance. In other embodiments, skin 420 may include isolation grooves 416 but surface 424 of rib 426 may be smooth and not include isolation grooves 422.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An adhesive joint for an aircraft comprising:
   a wing rib having a first surface forming a plurality of isolation grooves, the isolation grooves oriented transverse to the wing rib;
   a wing skin having a second surface; and
   an adhesive forming a bondline between the first and second surfaces to bond the wing rib to the wing skin, the adhesive substantially filling the isolation grooves to form a plurality of disbond arrest boundaries;
   wherein, the disbond arrest boundaries are operable to prevent a disbond in the bondline from traversing therethrough, thereby preventing the disbond from propagating along the bondline across the disbond arrest boundaries.

2. The adhesive joint as recited in claim 1 wherein the disbond arrest boundaries define a plurality of isolation regions;
   wherein the disbond originates in one of the plurality of isolation regions; and
   wherein the disbond arrest boundaries are operable to prevent the disbond from traversing therethrough, thereby isolating the disbond to the originating isolation region.

3. The adhesive joint as recited in claim 1 wherein the bondline further comprises a non-uniform bondline.

4. The adhesive joint as recited in claim 1 wherein the isolation grooves are substantially parallel to one another; and
   wherein the disbond arrest boundaries are substantially parallel to one another.

5. The adhesive joint as recited in claim 1 wherein the isolation grooves have a substantially uniform depth.

6. The adhesive joint as recited in claim 1 wherein the isolation grooves each has the same shape.

7. The adhesive joint as recited in claim 1 wherein the isolation grooves are substantially evenly spaced along the first surface.

8. The adhesive joint as recited in claim 1 wherein the isolation grooves further comprise macroscopic isolation grooves.

9. The adhesive joint as recited in claim 1 wherein the isolation grooves further comprise linear isolation grooves.

10. The adhesive joint as recited in claim 1 further comprising at least one bondline gap in the at least one disbond arrest boundary.

11. The adhesive joint as recited in claim 1 wherein the first and second surfaces each further comprise a material selected from the group consisting of composite materials and metal materials.

12. The adhesive joint as recited in claim 1 wherein each transversely oriented isolation groove originates from the inboard edge of the wing rib and terminates at the outboard edge of the wing rib.

13. The adhesive joint as recited in claim 1 wherein each isolation groove has a width W, the distance between adjacent isolation grooves greater than width W.

14. The adhesive joint as recited in claim 1 wherein the isolation grooves further comprise round-nosed isolation grooves.

15. The adhesive joint as recited in claim 14 wherein the one or more round-nosed isolation grooves each has one of a sine wave shape or a mouse hole shape.

16. The adhesive joint as recited in claim 1 wherein the one or more isolation grooves further comprise one or more angular isolation grooves.

17. The adhesive joint as recited in claim 16 wherein the one or more angular isolation grooves each has one of a square shape, a rectangular shape or a V-shape.

18. An aircraft comprising:
    a wing rib having a first surface forming a plurality of isolation grooves, the isolation grooves oriented transverse to the wing rib;
    a wing skin having a second surface; and
    an adhesive forming a bondline between the first and second surfaces to bond the wing rib to the wing skin, the adhesive substantially filling the isolation grooves to form a plurality of disbond arrest boundaries;
    wherein, the disbond arrest boundaries are operable to prevent a disbond in the bondline from traversing therethrough, thereby preventing the disbond from propagating along the bondline across the disbond arrest boundaries.

19. The aircraft as recited in claim 18 further comprising:
    a wing spar having a third surface forming a plurality of isolation grooves, the isolation grooves in the wing spar oriented transverse to the wing spar;
    wherein the adhesive forms a bondline between the second and third surfaces to bond the wing spar to the wing skin, the adhesive substantially filling the isolation grooves in the wing spar.

20. The aircraft as recited in claim 18 further comprising:
    a fuselage frame member having a third surface forming a plurality of isolation grooves, the isolation grooves in the fuselage frame member oriented transverse to the fuselage frame member;
    wherein the adhesive forms a bondline between the second and third surfaces to bond the fuselage frame member to the wing skin, the adhesive substantially filling the isolation grooves in the fuselage frame member.

* * * * *